US012624913B1

(12) United States Patent
Vitulli

(10) Patent No.: US 12,624,913 B1
(45) Date of Patent: May 12, 2026

(54) GUN MAGAZINE SPRING STATE INDICATION SYSTEM AND METHOD

(71) Applicant: Brandon Vitulli, Thomasville, GA (US)

(72) Inventor: Brandon Vitulli, Thomasville, GA (US)

(73) Assignee: Check-Mate Industries, Thomasville, GA (US)

( * ) Notice: Subject to any disclaimer, the term of this patent is extended or adjusted under 35 U.S.C. 154(b) by 0 days.

(21) Appl. No.: 19/045,929

(22) Filed: Feb. 5, 2025

(51) Int. Cl.
F41A 9/70 (2006.01)
F16F 1/04 (2006.01)
F41A 9/65 (2006.01)

(52) U.S. Cl.
CPC ................ F41A 9/70 (2013.01); F16F 1/047 (2013.01); *F41A 9/65* (2013.01)

(58) Field of Classification Search
CPC ..................................... F41A 9/70; F41A 9/65
USPC ............................................................. 42/50
See application file for complete search history.

*Primary Examiner* — Reginald S Tillman, Jr.
(74) *Attorney, Agent, or Firm* — J. Wiley Horton

(57) ABSTRACT

A novel system and method for determining when a magazine spring has exceeded a compressive set tolerance and needs to be replaced. The spring includes a visual indicator. The visual indicator is positioned so that it is visible beyond the bottom of the magazine tube when the follower and magazine spring are inserted into the tube and the follower is raised to its uppermost position. The visual indicator is not visible beyond the bottom of the magazine when the spring has exceeded its compressive set tolerance.

17 Claims, 11 Drawing Sheets

GUN MAGAZINE SPRING STATE INDICATION SYSTEM AND METHOD

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of firearms. More specifically, the invention comprises a system and method for determining when a gun magazine spring has exceeded its useful life and needs to be replaced.

2. Description of the Related Art

The present invention pertains to magazine springs used in gun magazines. Many such springs suffer a reduction in uncompressed height as they age-resulting in feeding problems for the magazine. The reasons underlying this phenomenon are not entirely clear. Some publications describe this as cyclic fatigue. It may not be a true fatigue phenomenon, however, since that phenomenon tends to involve micro-fissures and eventually large crack propagation. "Compressive set" is also a term used to describe a reduction in uncompressed spring height.

Whatever the underlying causes, it is an accepted fact that many gun magazine springs experience a reduction in uncompressed height over time. The present invention proposes a system and method for detecting this issue and indicating the need to replace the spring. In order to understand the context of the proposed solution, it is important for the reader to consider some background descriptions of the gun magazine assemblies themselves.

The invention is well-suited to "double stack" magazines, in which at least a portion of the magazine houses two overlapping columns of cartridges. FIG. 1 provides a side elevation view of such a magazine assembly 10. This disclosure uses a directional convention (upper, lower, forward, rearward, etc.) that is based on the firearm. The assumption is that the firearm's barrel is held in a horizontal position with a magazine well configured to receive the inventive magazine facing downward (so that the magazine is loaded into the well by moving it generally upward). "Forward" is toward the muzzle and "rearward" is the opposite. "Left" is the left side of the firearm and "right" is the opposite. "Width" refers to a measurement taken in a direction that is horizontal and perpendicular to the barrel. "Length" refers to a measurement taken in a direction that is parallel to the barrel. The orientation shown in FIG. 1 is the orientation in which a magazine will typically be used. The firearm into which the magazine is inserted—in this case a pistol—is normally held and fired upright with the opening for the magazine (often called the "magazine well") being contained within a grip the user holds.

Tube 12 provides the main structure of the magazine assembly. The term "tube" is conventional in the industry, even though the structure is not round. The tube is typically a thin-walled hollow structure, open at the top and bottom. Rearward wall 25 is generally perpendicular to the tube's side walls. Forward wall 27 is more rounded.

Base 14 can be any structure that is attached to the lower portion of the tube 12. It is preferable for the base to provide gripping features that facilitate the quick removal of the magazine. In the example of FIG. 1, base 14 includes an expanding section that is easily grasped.

Follower 16 slides up and down within the hollow interior of tube 12. The upper portion of the tube tapers inward. The very top portion of the tube preferably includes a pair of feed lips/rails (Some magazines incorporate a pair of rearward feed lips and a pair of forward feed rails. Pistol magazines, such as the one shown, often combine these features). The feed lips/rails properly locate a cartridge being fed by the magazine so that a moving slide will "strip" a fresh cartridge off the top of the magazine each time the firearm cycles. Follower 16 is sized so that it cannot escape through the feed lips/rails and out the top of the tube. The follower is thus captured within the tube. When the last cartridge is moved out of the magazine, follower 16 will be arrested in its fully raised position-which is shown in FIG. 1.

FIG. 1 includes a cutaway through the side wall facing the viewer. Spring 18 rests within the tube's interior-compressed between base 14 and follower 16. The spring remains in a compressed state in all the normal operations of the magazine. The base is retained in a fixed position, so the degree of compression of the spring is determined by the vertical position of the follower within the tube. The spring urges the follower upward. The follower, in turn, urges the cartridges contained within the magazine upward.

The exemplary magazine assembly 10 has many other conventional features needed for the operation of a firearm. For example, magazine latch relief 20 receives a firearm magazine latch that holds the magazine in the firearm until a user releases the latch. Inward planar indentations 24 are provided in each of the side walls. These serve to guide the sides of the cartridges contained within the magazine and provide an additional volume rearward of the planar indentations for the rims of the cartridges. Angled indentations 26 (one on each side) assist the cartridges in traveling upward from the double-stack region of the magazine and through a transition region where the cartridges transition toward a single-stack configuration (though not necessarily a fully developed single-stack configuration).

Slide latch relief 22 is formed in the forward portion of follower 16. As those skilled in the art will know, a slide latch relief is needed so that—after the last round is fed from the magazine—a tab on the firearm's slide latch will move into relief 22 and cause the slide latch to hold the firearm's slide in the open position. Many other conventional features may be included in the inventive magazine. These include various types of feed lips, feed rails, and partial feed ramps. The inventive magazine may also include one or more openings that allow a user to see the number of cartridges contained in the magazine.

FIG. 2 shows the same exemplary magazine in a rear elevation view. The reader will note how the two side walls angle inward when traveling from double stack region 28 of the magazine to transition region 30 and ultimately to the vicinity of feed rails/lips 34. The reader will note how the narrowing and partial closure of the top of the magazine tube "captures" follower 16 at the uppermost point in its travel. A cutaway in the rearward wall allows the reader to again see a portion of spring 18.

A magazine assembly is generally created by inserting the follower and spring through the open lower end of the tube. The spring is then compressed and the lower end of the tube is closed by the addition of a base. In this context the term "base" should be broadly understood to mean a component or assembly of components that restrains the lower end of the magazine spring. There are endless ways to attach a base to the magazine tube. FIGS. 2-5 illustrate one good approach.

In FIG. 2, the reader will note a "callout" for FIG. 5. FIG. 5 provides a detailed view of a portion of FIG. 2. In FIG. 5, the reader will note how lateral flange 44 projects outward (to the left) at the bottom of tube 12. A second lateral flange projects from the right side of the tube. Base 14 includes two lateral slots 46 designed to slidably engage the two lateral flanges 44. The base attaches to the tube by sliding the two lateral slots 46 over the two lateral flanges 44.

FIGS. 3 and 4 illustrate the selective removal of the base from the tube. FIG. 3 shows a sectional view through the middle of the assembly (note callout in FIG. 2). Base 14 is secured to tube 12 via engagement of the lateral flanges on the tube with the lateral slots in the base. This arrangement allows the base to slide free of the tube when moved in the forward direction. However, the base is normally restrained by a second engagement. Plate 36 in this example is a thin metal plate that fits within the open bottom of the tube. Protrusion 38 extends downward from plate 36. Base 14 includes an opening 40 positioned to receive protrusion 38 as shown. Cavity 42 is preferably provided in the lower portion of base 14 to provide access to opening 40.

In order to remove the base from the tube, the user employs a pointed object to press upward on protrusion 38. This motion compresses spring 18 and raises protrusion 38 clear of opening 40. The user can then slide base 14 forward (to the left in the view of FIG. 3) to remove the base from the tube. FIG. 4 shows base 14 after it has been moved free of tube 12. The reader will note that lateral slots 46 in the base are clear of the lateral flanges on the tube. At this point plate 36 is free to slide out the bottom of the tube, along with the magazine spring and follower.

Still looking at FIG. 4, the reader will note how plate 36 in this embodiment has an upward tilting rearward portion 50 and an upward tilting forward portion 52. These tend to center the first coil of the magazine spring on plate 36. Many other variations are possible for the base. In some of these embodiments a depression can be integrally molded into the upward-facing surface of the base and this helps to locate the lower portion of the magazine spring. The invention is not limited to any particular type of base or combination of base and plate.

An exemplary follower is shown in FIGS. 6-8. FIG. 6 shows the left side and front of follower 16. Forward skirt 78 descends from the forward portion of the follower and rearward skirt 80 descends from the rearward portion. The upward-facing surface includes curved cradle 82. Ridge 84 blends curved cradle 82 into the upper portion of the follower. The curved cradle is shaped to engage the cylindrical exterior surface of the lowermost cartridge in a stack of cartridges. The shape of the cradle urges that cartridge to the right and upwards.

Chamfer 86 is provided on the upper rear portion of the follower. The chamfer is provided to ease the passing of a cartridge base over the top of the follower as the last round is fed into the firearm. The chamfer also allows the advancing breech face (on the slide) to pass over the top of the follower in the event the user releases the slide latch and returns the slide to its forward position after the last round is fired.

Left notch 74 and right notch 76 are provided on the lateral sides of the follower. Left notch 74 engages angled indentation 26 on the left side of the magazine. This interaction helps to center the follower as it travels upward toward the top of the tube. Right notch 76 engages the angled indentation on the right side of the magazine.

FIG. 7 shows the downward-facing portion of the follower. The lower portion opens into a hollow spring receiver cavity 88. The cavity is located between forward skirt 78 and rearward skirt 80 (and extends upward into the interior of the follower). Spring engagement features are preferably included. In this example, forward boss 90 and rearward boss 92 extend downward within the spring receiver cavity in order to engage the top of the spring.

FIG. 8 provides an exploded perspective view of follower 16 and the top of the spring. Second semi-circle 58 of Coil 12 fits around rearward boss 92. First semi-circle 54 of Coil 13 fits around forward boss 90. These features positively connect the follower to the spring.

The present invention can be applied to virtually any combination of magazine tube, follower, and magazine spring. FIG. 10 provides a perspective view of an exemplary magazine spring 18. The spring is shown in a free, uncompressed state. Most compression springs follow a helical path, but this particular exemplary spring 18 has a much more complex shape. The lower portion is curved but sized to fit within the rectangular horizontal cross section of the double stack portion of the magazine tube. The upper portion transitions into a different ratio of length to width in order to fit within transition region 30 near the top of the magazine tube.

Some exemplary dimensions will serve to illustrate the changing nature of the coils as one proceeds from the lower end to the upper end of the spring. Proximate lower end 120, the spring is 1.180 inches (3.00 cm) long and 0.86 inches (2.18 cm) wide. Proximate the middle (of the overall height) the exemplary spring is 0.86 inches long (2.18 cm) and 0.59 (1.50 cm) inches wide. Near the very top the exemplary spring is 0.97 inches (2.46 cm) long and 0.31 inches (0.79 cm) wide.

As the spring is a continuous swept section—with the section ideally being uniform—it is difficult to describe using conventional terminology. Accordingly, a new descriptive lexicon is employed. It is known in the art to describe a spring in terms of each "coil"—with a coil representing each 360 degree revolution of the swept section. In the present nomenclature, each coil is further divided into four regions-forward, left, rearward, and right regions. The forward region lies proximate the forward wall of the magazine tube. The left region lies proximate the left wall. The rearward region lies proximate the rearward wall. The right region lies proximate the right wall. This type of description is useful in describing the behavior of the spring as it is compressed.

The spring starts with lower end 120. The lowermost forward region is denoted as "1" in FIG. 10. The lowermost rearward region is denoted as "2." The lowermost left region is denoted as "A." Proceeding around the first coil of the spring, the nomenclature is therefore lower end 120, followed by forward region 1, followed by left region A, followed by rearward region 2, followed by right region B. In this system, the forward regions are given odd numbers and the rearward regions are given even numbers.

The reader will note that the forward regions of the coils are given odd numbers—1, 3, 5, 7, 9, and so on. The rearward regions are given even numbers—2, 4, 6, 8, and so on. The left regions are given the letters A, C, E, G, I, and so on. The right regions are given the letters B, D, F, H, and so on. This nomenclature will aid the reader's understanding of how the present invention is applied.

As explained initially-many magazine springs suffer a reduction in uncompressed height as they age. The reduction in uncompressed height indicates that the spring has undergone some form of compressive set. Cartridge feeding problems are well associated with this compressive set. Accordingly, a spring that has experienced a significant compressive set should be replaced. It is difficult for a user to detect this phenomenon in the prior art. The present invention provides a simple and effective way to detect a compressive set that has exceeded a predefined limit.

BRIEF SUMMARY OF THE PRESENT INVENTION

The present invention integrates a novel system and method for determining when a magazine spring has exceeded a compressive set tolerance and needs to be replaced. The spring includes a visual indicator. The visual indicator is positioned so that it is visible beyond the bottom of the magazine tube when the follower and magazine spring are inserted into the tube and the follower is raised to its uppermost position. The visual indicator is not visible beyond the bottom of the magazine when the spring has exceeded its compressive set tolerance.

Figure 1:
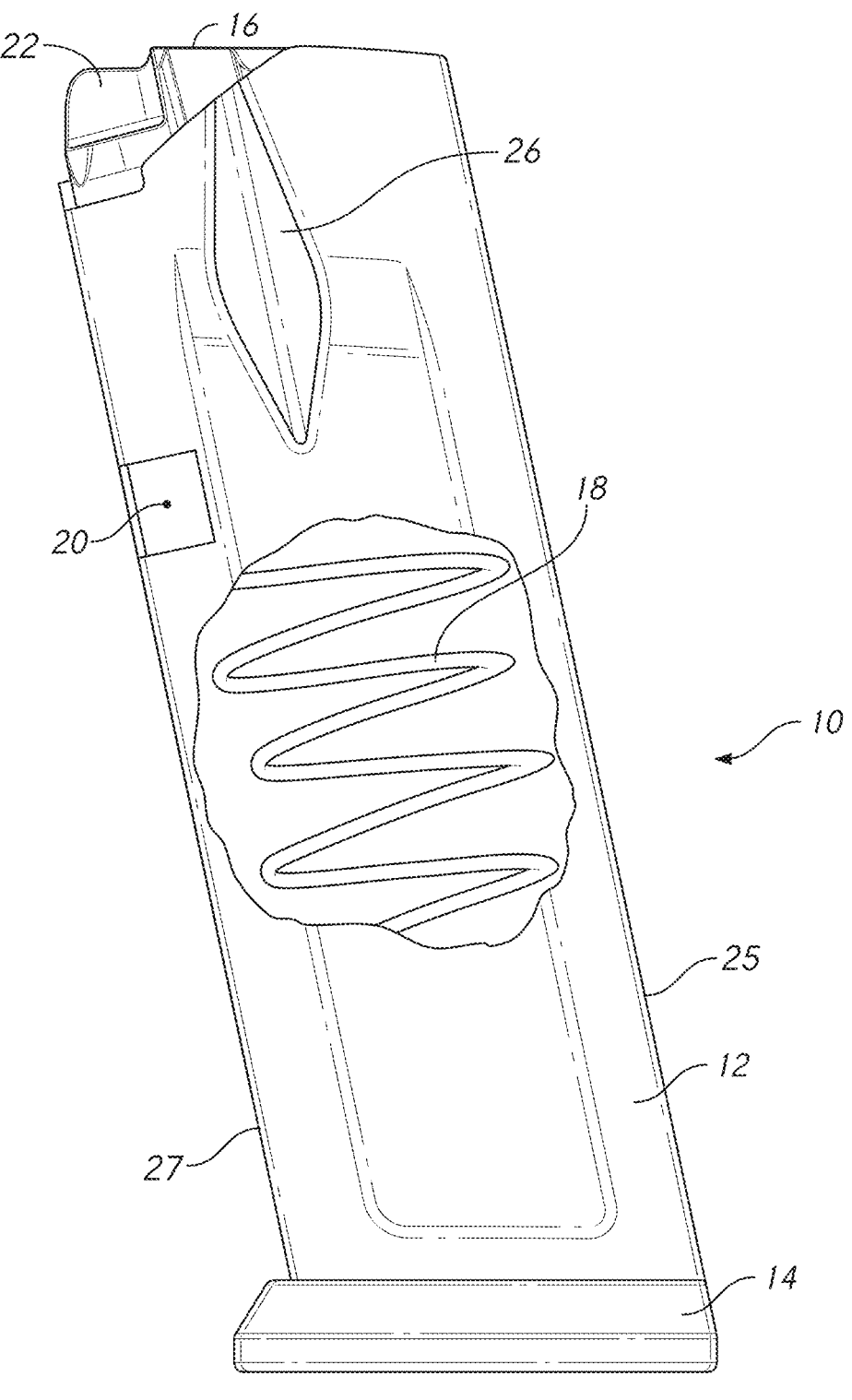
FIG. 1 is a side elevation view with a cutaway, showing an embodiment of the present invention.
Figure 2:
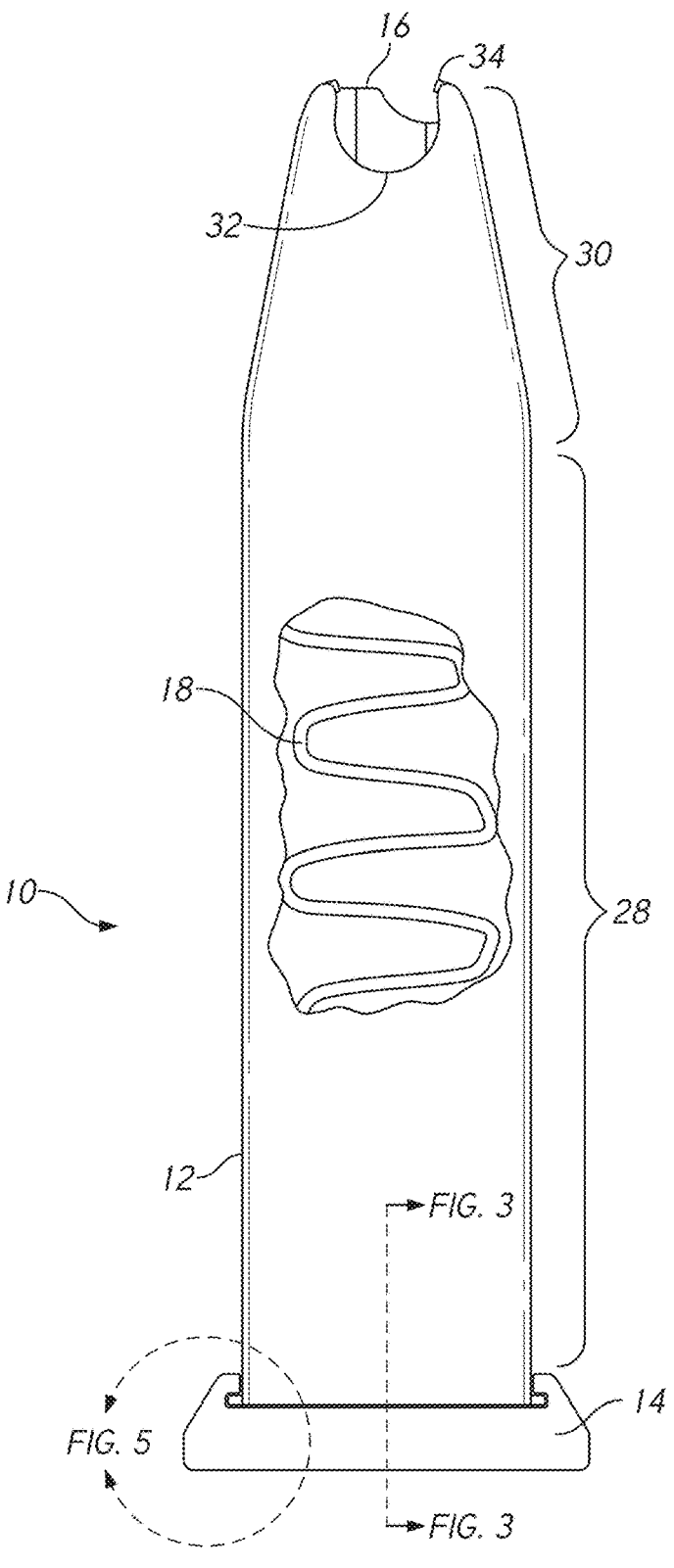
FIG. 2 is a rear elevation view with a cutaway, showing the embodiment of FIG. 1.

REFERENCE NUMERALS IN THE DRAWINGS 10 magazine assembly
12 tube 14 base
16 follower
18 spring
20 magazine latch relief
22 slide latch relief
24 planar indentation
25 rearward wall
26 angled indentation
27 forward wall
28 double stack region
30 transition region
32 feed relief
34 feed rail/lip
36 plate
38 protrusion
40 opening
42 cavity
44 lateral flange
46 longitudinal slot
50 rearward portion
52 forward portion
74 left notch
76 right notch
78 forward skirt
80 rearward skirt
82 curved cradle
84 ridge
86 chamfer
88 spring receiver cavity
90 forward boss
92 rearward boss
102 central lateral relief
120 lower end
122 upper end
152 lower boundary
154 upper boundary
156 lower tube plane

DETAILED DESCRIPTION OF THE INVENTION

The following descriptions pertain to preferred embodiments of the present invention. Having reviewed these descriptions, many more embodiments will occur to those skilled in the art. Accordingly, the scope of the invention should be set by the claims presented at the end of this disclosure rather than the embodiments described.

Figure 3:
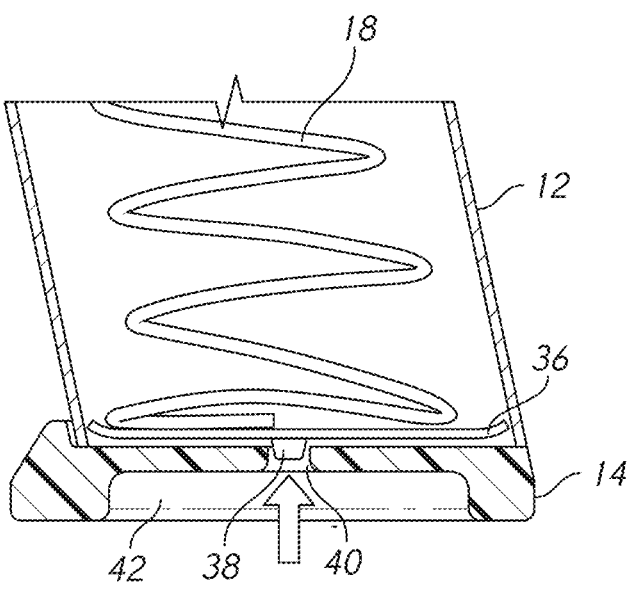
FIG. 3 is a sectional side elevation view, showing one embodiment of the magazine base.
Figure 4:
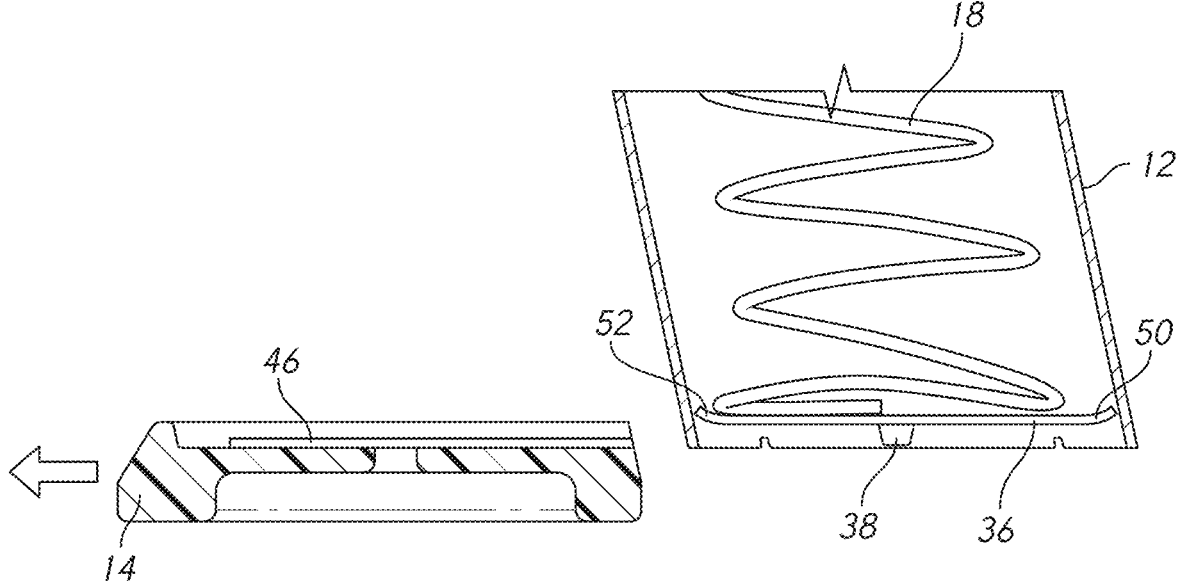
FIG. 4 is sectional side elevation view, showing the removal of the magazine base for the embodiment of FIG. 1.
Figure 5:
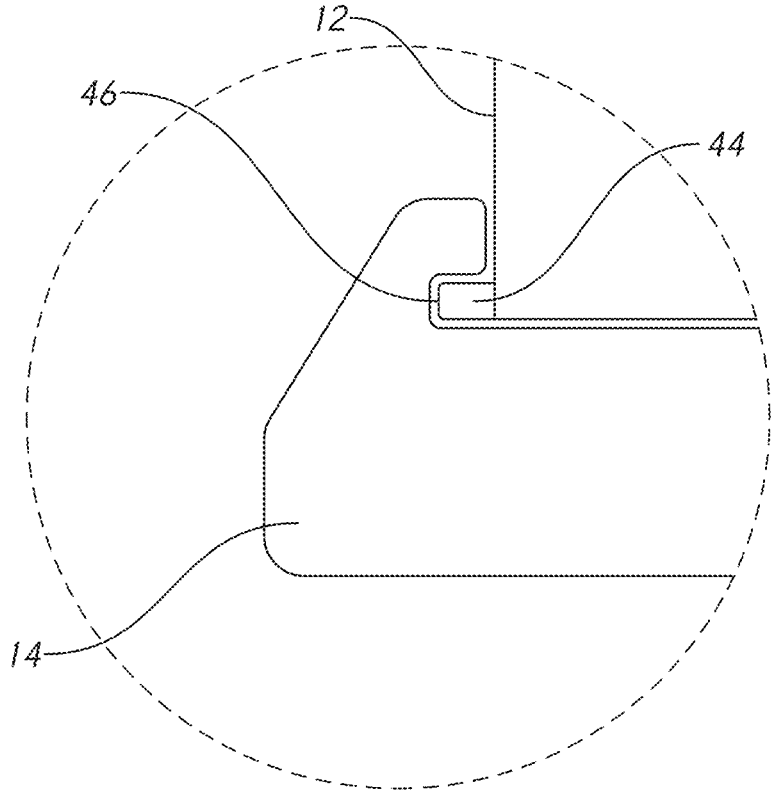
FIG. 5 is a detailed rear elevation view, showing how the base attaches to the tube in the embodiment of FIG. 1.
Figure 6:
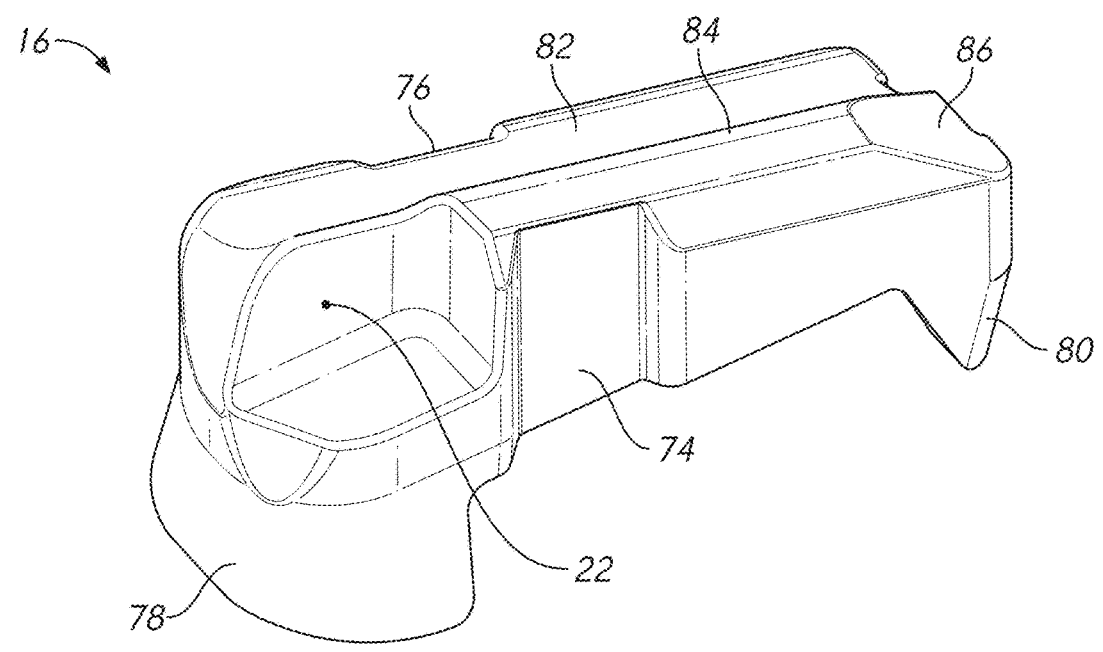
FIG. 6 is a perspective view, showing an embodiment of the magazine follower.
Figure 7:
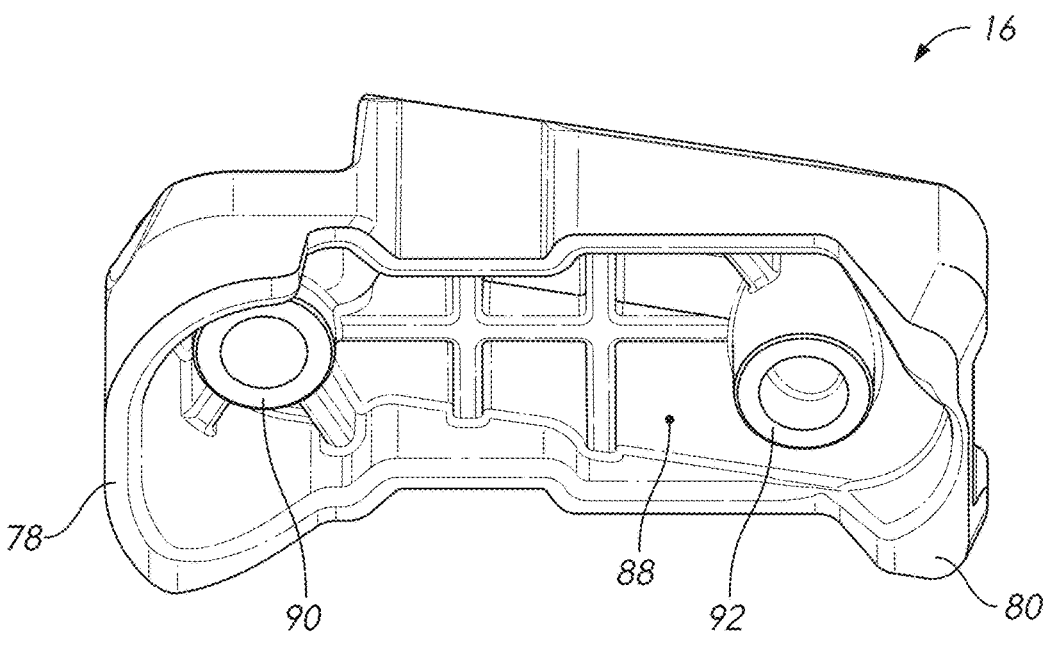
FIG. 7 is a perspective view, showing the follower of FIG. 6 from another vantage point.
Figure 8:
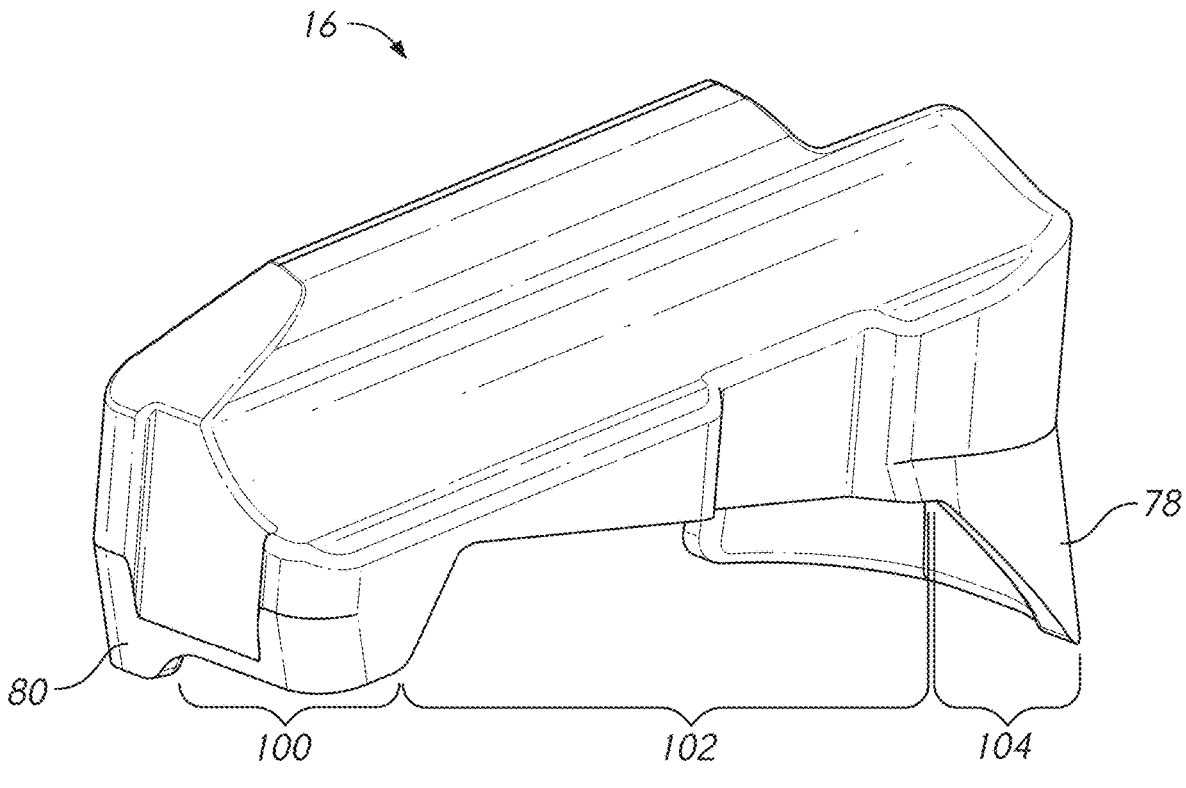
FIG. 8 is a perspective view, showing the follower of FIG. 6 from another vantage point.
Figure 9:
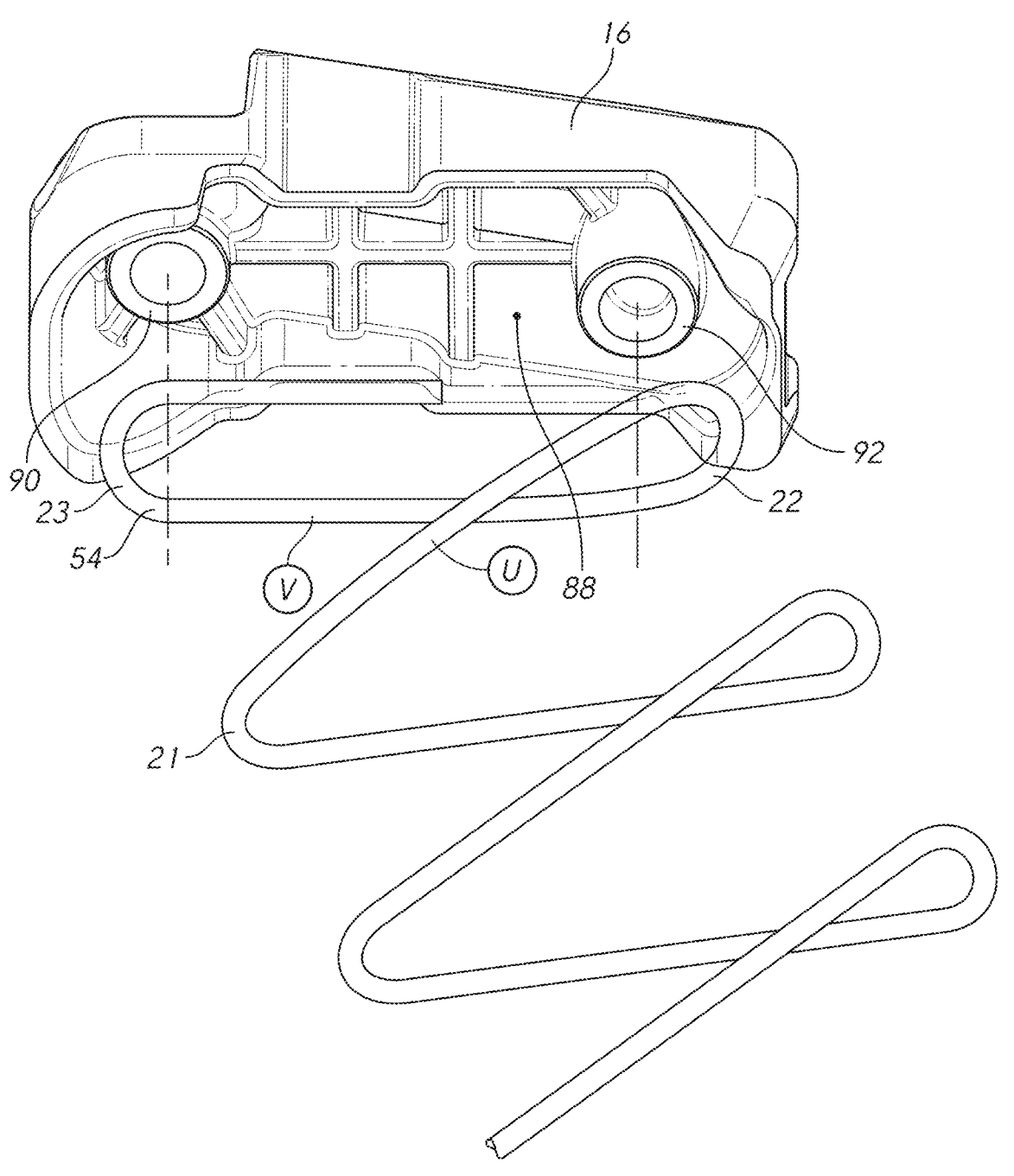
FIG. 9 is a perspective view, showing the interface between the follower and the spring.
Figure 10:
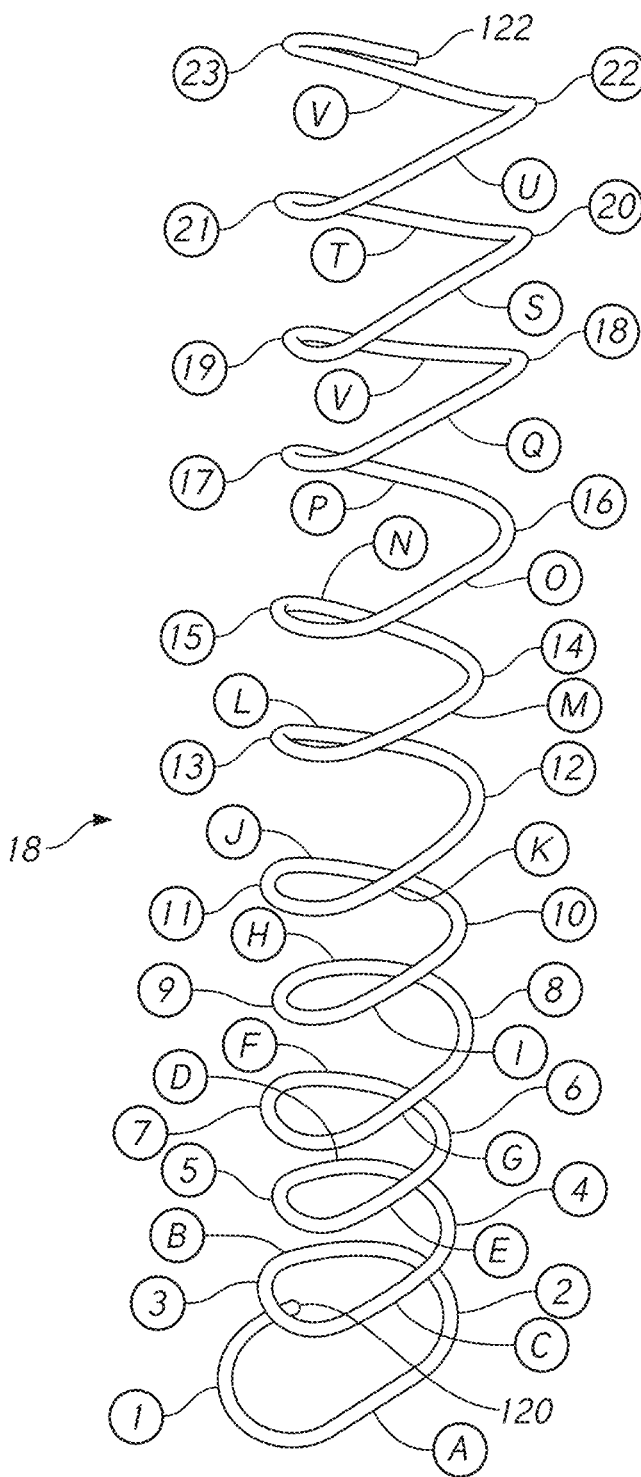
FIG. 10 is a perspective view, showing an exemplary magazine spring.
Figure 11:
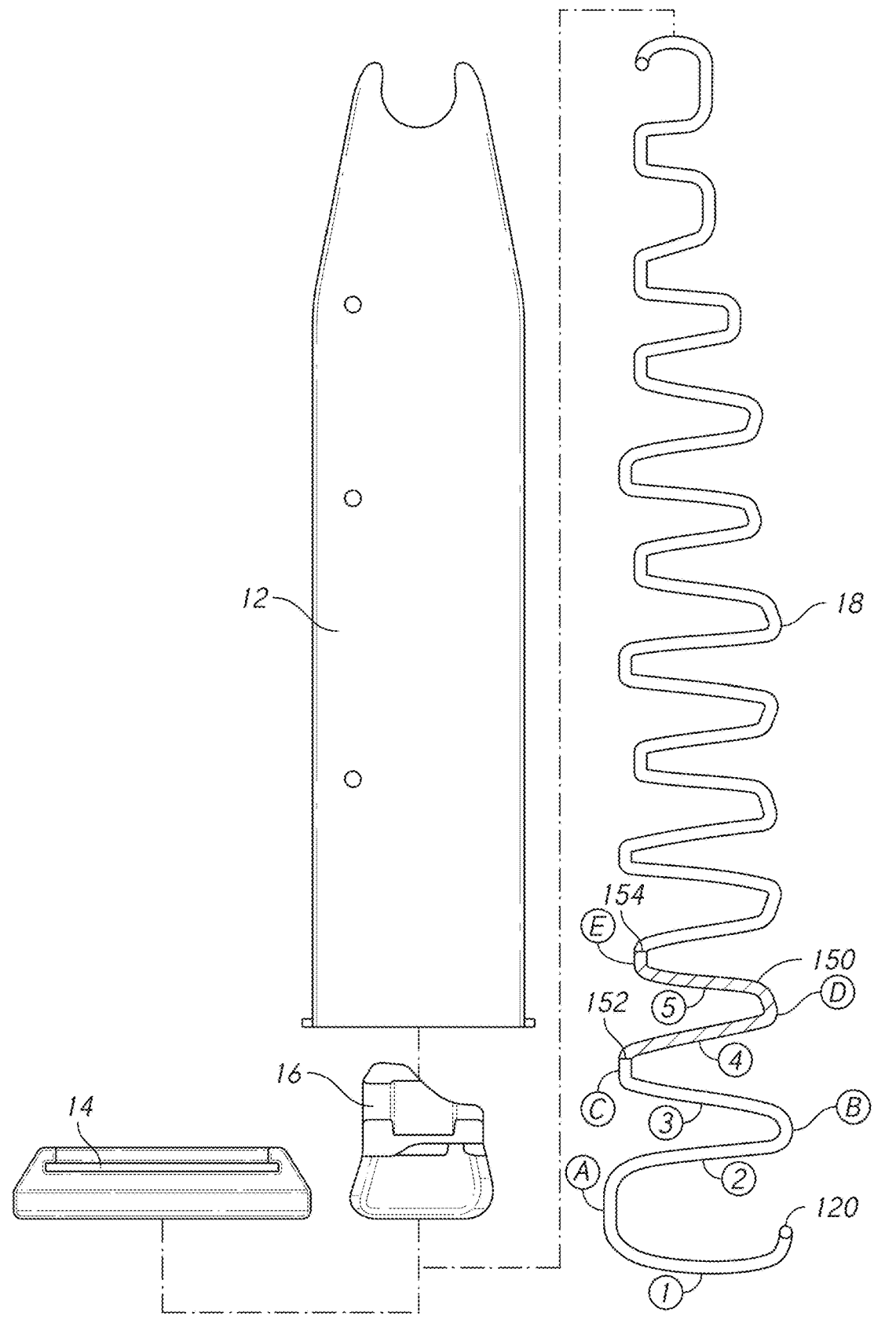
FIG. 11 is a rear elevation view, showing a magazine spring marked according to the present invention.

FIG. 11 depicts a magazine spring system constructed according to the present invention. As for the prior art, a functioning magazine is created by inserting a follower 16 and a magazine spring 18 into the open bottom of a magazine tube 12. Spring 18 is then compressed and the open bottom of the magazine is closed by the addition of a plate (such as shown in FIG. 3) and a base 14.

In the present invention, an indicator region 150 is added to magazine spring 18. The indicator region extends along the spring 18 between upper boundary 154 and lower boundary 152. The indicator region can be anything that contrasts in appearance with the rest of the spring. A simple example is the addition of a painted region. The paint can be any desired color—with green being a suitable choice. The indicator region could also be a film added to the surface of the spring, a different texture added to the surface, a different surface treatment such as etching or bluing, or a polished region. Whatever approach is taken, the addition of the indicator region will preferably not impact the mechanical performance of the spring-either in terms of its ability to freely slide within the magazine tube or its ability to undergo many compressive cycles without undue compression or fatigue.

Figure 12:
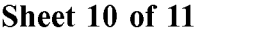
FIG. 12 is a rear elevation view, showing the operation of the present invention.

FIG. 12 shows the assembly of the magazine tube 12, follower 16, and magazine spring 18. The upper portion of the magazine spring has been pressed against the follower or otherwise engaged with the follower to establish the normal operating relationship between the magazine spring and the follower. The follower has been raised to its uppermost position within the magazine tube. The spring is shown in an uncompressed state in FIG. 12. The reader will observe that a portion of indicator region 150 extends out the bottom of the magazine tube and is therefore visible to a user.

In the example shown, the indicator region is given a bright green color. The user therefore observes a bright green portion of the spring extending out the bottom of the magazine tube. The visibility of the green portion beyond the magazine tube "tells" the user that the spring has not taken a significant compressive set and is therefore still good for further service.

Lower boundary 152 is carefully located for a spring made according to the present invention. The lower boundary is placed so that when the magazine spring has exceeded a predetermined limit for compressive set, the lower boundary will rest within the magazine tube (in the uncompressed spring state shown in FIG. 12) and the lower boundary will therefore no longer be visible. The inability to see any portion of indicator region 150 "tells' the user that the spring has undergone a compressive set beyond the desired limit and should be replaced.

In the example of FIG. 12, magazine tube 12 has a planer open bottom-indicated as lower tube plane 156. Most magazine tubes have a planar open bottom. There are often tabs, slots or other features that interrupt the bottom being purely planar. However, a user will usually have no trouble identifying a lower tube plane 156 and this can then be used as a reference sighting position (The user aligns his or her eye along the lower tube plane). With this sighting position set, the user can then accurately determine whether any portion of indicator region 150 is visible. As explained previously, lower boundary 152 is defined so that if it is visible the spring is deemed adequate for continued use. Thus, if even a little part of indicator region 156 is visible the spring is adequate for continued use.

Compressive set tends to increase over time rather than being a phenomenon that happens suddenly. It is therefore preferable to provide an indicator region rather than a small indicator (such as a single stripe) located on lower boundary 152. The provision of a larger indicator region means that the user can perceive the gradual reduction in uncompressed spring height over time. If a green indicator region is used, the user will notice less and less green showing below the magazine when performing the test depicted in FIG. 12 over a period of time.

Figure 13:
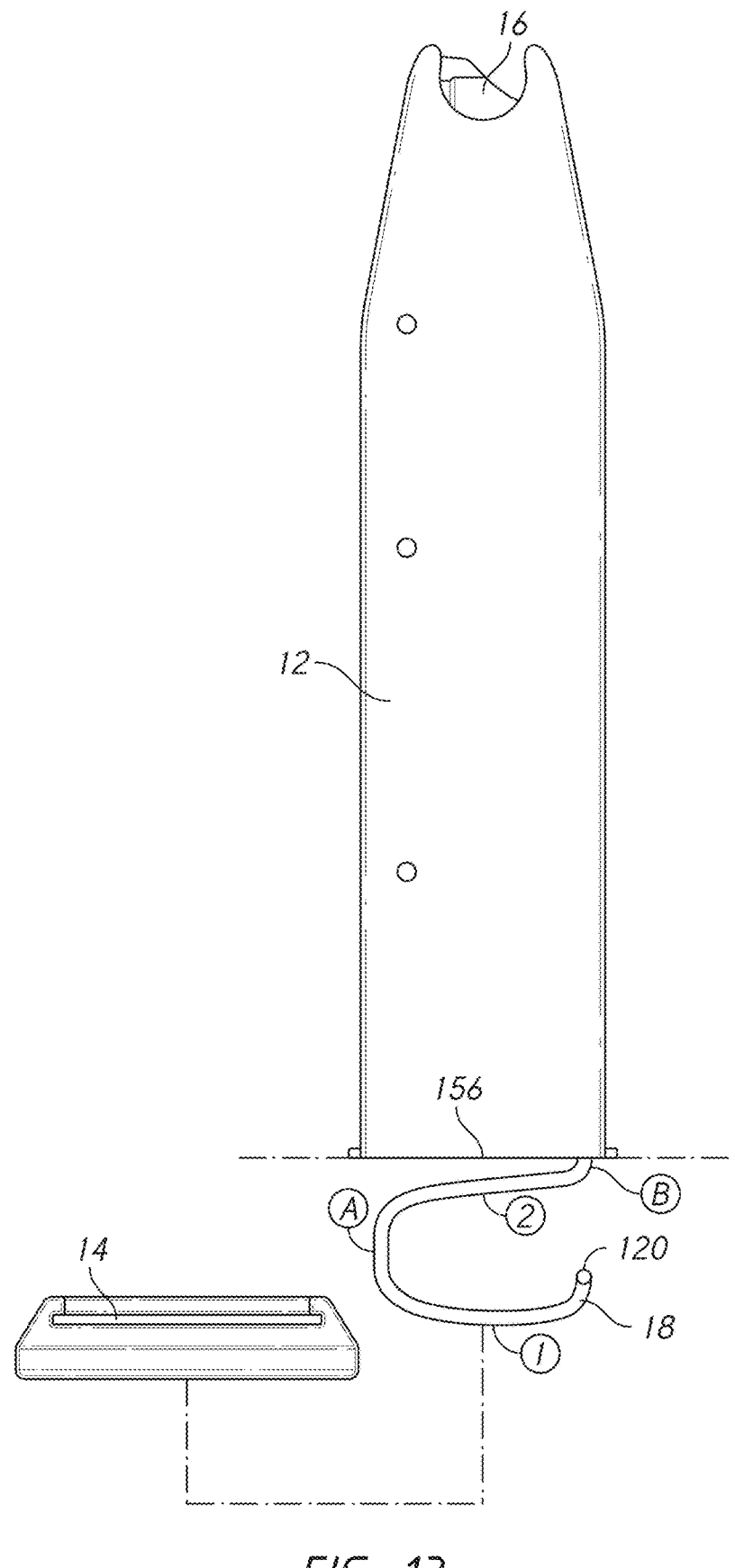
FIG. 13 is a rear elevation view, showing the operation of the present invention.

If the spring is not replaced it will eventually appear as depicted in FIG. 13. In this view, the follower and spring are assembled within the magazine tube as before. The spring is in an uncompressed state. However, no portion of indicator region 150 (including lower boundary 152) is visible below lower tube plane 156. This clearly informs the user that the magazine spring needs to be replaced.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

I claim:

1. A method for a user to determine when a magazine spring has experienced an excessive compressive set, comprising: (a) providing a magazine tube having an open bottom; (b) providing a follower; (c) providing a magazine spring, including, (i) an upper portion, (ii) an indicator region, having a lower boundary; (d) placing said follower in said magazine tube; (e) placing said magazine spring in said magazine tube, with said upper portion of said magazine spring being connected to said follower; (f) raising said follower and said magazine spring until said follower is arrested at an uppermost point in its range of travel, said magazine spring being in an uncompressed state; and (f) said user observing whether any of said indicator region extends beyond said bottom of said magazine tube, wherein said indicator region has a distinct color in comparison to a portion of said magazine spring lying below said lower boundary of said indicator region.

2. The method for a user to determine when a magazine spring has experienced an excessive compressive set as recited in claim 1, wherein said distinct color is green.

3. The method for a user to determine when a magazine spring has experienced an excessive compressive set as recited in claim 1, wherein: (a) said bottom of said magazine tube lies in a plane; and (b) said user determines whether said magazine spring has experienced an excessive compressive set by observing whether any portion of said indicator region extends below said plane.

4. The method for a user to determine when a magazine spring has experienced an excessive compressive set as recited in claim 1, wherein said indicator region has an upper boundary in addition to said lower boundary.

5. The method for a user to determine when a magazine spring has experienced an excessive compressive set as recited in claim 1, wherein said magazine spring is pressed into a lower portion of said follower in order to connect said magazine spring to said follower.

6. The method for a user to determine when a magazine spring has experienced an excessive compressive set as recited in claim 1, wherein: (a) said bottom of said magazine tube lies in a plane; and (b) said user determines whether said magazine spring has experienced an excessive compressive set by observing whether any portion of said indicator region extends below said plane.

7. A method to determine when a magazine spring needs to be replaced, comprising: (a) providing a magazine tube having a bottom; (b) providing a follower; (c) providing a magazine spring, including, (i) an upper portion, (ii) an indicator region, having a lower boundary; (d) placing said follower in said magazine tube; (e) placing said magazine spring in said magazine tube, with said upper portion of said magazine spring being connected to said follower; (f) raising said follower and said magazine spring until said follower is arrested at an uppermost point in its range of travel; and (g) with said magazine spring is in an uncompressed state, inspecting said assembly of said magazine tube, said follower, and said magazine spring in order to determine whether any of said indicator region extends beyond said bottom of said magazine tube, wherein said indicator region has a distinct color in comparison to a portion of said magazine spring lying below said lower boundary of said indicator region.

8. The method for a user to determine when a magazine spring needs to be replaced as recited in claim 7, wherein said distinct color is green.

9. The method for a user to determine when a magazine spring needs to be replaced as recited in claim 7, wherein: (a) said bottom of said magazine tube lies in a plane; and (b) said user determines whether said magazine spring has experienced an excessive compressive set by observing whether any portion of said indicator region extends below said plane.

10. The method for a user to determine when a magazine spring needs to be replaced as recited in claim 7, wherein said indicator region has an upper boundary in addition to said lower boundary.

11. The method for a user to determine when a magazine spring needs to be replaced as recited in claim 7, wherein said magazine spring is pressed into a lower portion of said follower in order to connect said magazine spring to said follower.

12. The method for a user to determine when a magazine spring needs to be replaced as recited in claim 7, wherein: (a) said bottom of said magazine tube lies in a plane; and (b) said user determines whether said magazine spring has experienced an excessive compressive set by observing whether any portion of said indicator region extends below said plane.

13. A method to determine when a magazine spring needs to be replaced, said magazine spring configured for use in a magazine tube having a sliding follower, comprising: (a) providing an indicator region on said magazine spring, said indicator region having a lower boundary; (b) placing said follower in said magazine tube; (c) placing said magazine spring in said magazine tube, with said upper portion of said magazine spring being connected to said follower; (d) raising said follower and said magazine spring until said follower is arrested at an uppermost point in its range of travel; and (e) with said magazine spring is in an uncompressed state, inspecting said assembly of said magazine tube, said follower, and said magazine spring in order to determine whether any of said indicator region extends beyond said bottom of said magazine tube, wherein said indicator region has a distinct color in comparison to a portion of said magazine spring lying below said lower boundary of said indicator region.

14. The method for a user to determine when a magazine spring needs to be replaced as recited in claim 13, wherein said distinct color is green.

15. The method for a user to determine when a magazine spring needs to be replaced as recited in claim 13, wherein: (a) said bottom of said magazine tube lies in a plane; and (b) said user determines whether said magazine spring has experienced an excessive compressive set by observing whether any portion of said indicator region extends below said plane.

16. The method for a user to determine when a magazine spring needs to be replaced as recited in claim 13, wherein said indicator region has an upper boundary in addition to said lower boundary.

17. The method for a user to determine when a magazine spring needs to be replaced as recited in claim 13, wherein said magazine spring is pressed into a lower portion of said follower in order to connect said magazine spring to said follower.

* * * * *